US012421853B2

(12) United States Patent
Ray et al.

(10) Patent No.: US 12,421,853 B2
(45) **Date of Patent: *Sep. 23, 2025**

(54) TURBINE ENGINE WITH REDUCED CROSS FLOW AIRFOILS

(71) Applicants: GE Avio S.r.l., Rivalta di Torino (IT); General Electric Company, Schenectady, NY (US)

(72) Inventors: Saurya Ranjan Ray, Karnataka (IN); Francesco Bertini, Rivalto di Torino (IT); Lyle Douglas Dailey, Maineville, OH (US); Jeffrey D. Clements, Mason, OH (US); Jaikumar Loganathan, Karnataka (IN); Simone Rosa Taddei, Collegno (IT)

(73) Assignees: GE Avio S.r.l., Turin (IT); General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,594

(22) Filed: Mar. 4, 2024

(65) Prior Publication Data

US 2024/0254882 A1 Aug. 1, 2024

Related U.S. Application Data

(63) Continuation of application No. 17/523,505, filed on Nov. 10, 2021, now Pat. No. 11,959,393.

(30) Foreign Application Priority Data

Feb. 2, 2021 (IT) ........................ 102021000002240

(51) Int. Cl.
*F01D 5/14* (2006.01)

(52) U.S. Cl.
CPC ........ *F01D 5/141* (2013.01); *F05D 2240/301* (2013.01); *F05D 2240/305* (2013.01); (Continued)

(58) Field of Classification Search
CPC .................................. F01D 5/141; F01D 5/14
See application file for complete search history.

(56) References Cited

U.S. PATENT DOCUMENTS 3,012,709 A * 12/1961 Schnell ................ F04D 29/324 416/236 R
3,039,736 A 6/1962 Pon
(Continued)

FOREIGN PATENT DOCUMENTS

CN 109209511 A 1/2019
DE 1046246 B 12/1958
(Continued)

*Primary Examiner* — Michael L Sehn
(74) *Attorney, Agent, or Firm* — Wood Herron & Evans LLP

(57) ABSTRACT

An airfoil assembly has a platform and an airfoil. The platform has an upstream edge, a downstream edge, and a surface extending between the upstream edge and the downstream edge. At least a portion of the surface extends circumferentially along a surface baseline defined by a constant radial distance from the rotational axis. The airfoil has an outer wall. The outer wall extends between a root and a tip, and between a leading edge and a trialing edge. The airfoil assembly includes a fence provided along the outer wall.

20 Claims, 12 Drawing Sheets

(52) U.S. Cl.
CPC .. *F05D 2240/306* (2013.01); *F05D 2250/181* (2013.01); *F05D 2250/711* (2013.01); *F05D 2250/712* (2013.01)

(56) References Cited

U.S. PATENT DOCUMENTS

| | | | | | |
|---|---|---|---|---|---|
| 3,193,185 | A * | 7/1965 | Erwin | F04D 29/324 | 415/199.5 |
| 3,706,512 | A * | 12/1972 | Strelshik | F01D 5/141 | 416/194 |
| 4,012,165 | A | 3/1977 | Kraig | | |
| 4,023,350 | A | 5/1977 | Hovan et al. | | |
| 4,108,573 | A * | 8/1978 | Wagner | F01D 5/141 | 416/500 |
| 4,420,288 | A | 12/1983 | Bischoff | | |
| 4,512,718 | A | 4/1985 | Stargardter | | |
| 5,112,187 | A * | 5/1992 | Davids | F01D 5/145 | 415/169.3 |
| 5,275,531 | A | 1/1994 | Roberts | | |
| 6,478,545 | B2 | 11/2002 | Crall et al. | | |
| 6,508,626 | B1 | 1/2003 | Sakurai et al. | | |
| 7,665,964 | B2 | 2/2010 | Taylor et al. | | |
| 8,206,115 | B2 | 6/2012 | Gupta et al. | | |
| 8,257,032 | B2 | 9/2012 | Beeck et al. | | |
| 8,303,258 | B2 | 11/2012 | Aubin | | |
| 8,366,399 | B2 | 2/2013 | Allen-Bradley et al. | | |
| 8,403,645 | B2 * | 3/2013 | Barnes | F01D 5/143 | 416/234 |
| 8,721,291 | B2 | 5/2014 | Lee et al. | | |
| 8,920,127 | B2 | 12/2014 | McCaffrey | | |
| 9,347,323 | B2 * | 5/2016 | Gallagher | F04D 29/325 | |
| 9,359,900 | B2 * | 6/2016 | Chengappa | F01D 5/145 | |
| 9,598,967 | B2 | 3/2017 | Xu | | |
| 9,739,154 | B2 | 8/2017 | Derclaye et al. | | |
| 9,745,850 | B2 | 8/2017 | Guendogdu et al. | | |
| 9,874,221 | B2 * | 1/2018 | DiPietro, Jr. | F04D 29/324 | |
| 9,938,984 | B2 | 4/2018 | Dipietro et al. | | |
| 10,267,170 | B2 | 4/2019 | Clark et al. | | |
| 10,385,871 | B2 | 8/2019 | Lurie et al. | | |
| 10,458,247 | B2 | 10/2019 | Charbonnier et al. | | |
| 10,502,230 | B2 * | 12/2019 | Anderson | F01D 5/143 | |
| 10,577,955 | B2 | 3/2020 | Shirley et al. | | |
| 10,746,131 | B2 | 8/2020 | Ramm et al. | | |
| 11,125,089 | B2 | 9/2021 | Bertini et al. | | |
| 11,959,393 | B2 * | 4/2024 | Ray | F01D 5/146 | |
| 2007/0154314 | A1 | 7/2007 | Jarrah et al. | | |
| 2010/0080708 | A1 | 4/2010 | Gupta et al. | | |
| 2012/0051894 | A1 | 3/2012 | Clements et al. | | |
| 2013/0051996 | A1 | 2/2013 | Hoeger et al. | | |
| 2014/0328675 | A1 | 11/2014 | Derclaye et al. | | |
| 2014/0348660 | A1 | 11/2014 | Guendogdu et al. | | |
| 2015/0107265 | A1 | 4/2015 | Smith et al. | | |
| 2016/0186772 | A1 | 6/2016 | DiPietro, Jr. et al. | | |
| 2016/0186773 | A1 | 6/2016 | DiPietro, Jr. et al. | | |
| 2017/0089203 | A1 | 3/2017 | Lohaus | | |
| 2017/0114796 | A1 | 4/2017 | DiPietro, Jr. et al. | | |
| 2017/0226880 | A1 | 8/2017 | Winn et al. | | |
| 2018/0347582 | A1 | 12/2018 | Malmborg | | |
| 2019/0024673 | A1 | 1/2019 | Anderson | | |
| 2019/0178094 | A1 | 6/2019 | Schutte | | |
| 2019/0186271 | A1 | 6/2019 | Xu et al. | | |
| 2020/0036271 | A1 | 1/2020 | Kies | | |

FOREIGN PATENT DOCUMENTS

| | | | |
|---|---|---|---|
| DE | 102009018924 | A1 | 11/2010 |
| EP | 0978632 | A1 | 2/2000 |
| EP | 1035302 | B1 | 2/2006 |
| EP | 2746534 | A1 | 6/2014 |
| EP | 2806102 | A1 | 11/2014 |
| EP | 3163028 | A1 | 5/2017 |
| FR | 2938871 | A1 | 5/2010 |
| GB | 840543 | A | 7/1960 |
| GB | 2039627 | A | 8/1980 |
| JP | H09324605 | A | 12/1997 |
| WO | 2015142200 | A1 | 9/2015 |

* cited by examiner

TURBINE ENGINE WITH REDUCED CROSS FLOW AIRFOILS

CROSS REFERENCE TO RELATED APPLICATIONS

This application is a continuation of U.S. patent application Ser. No. 17/523,505, filed Nov. 10, 2021, now U.S. Pat. No. 11,959,393, which takes priority to Italian Patent Application Serial No. 102021000002240, filed Feb. 2, 2021, both of which are incorporated herein by reference in its entirety.

TECHNICAL FIELD

The disclosure generally relates to an airfoil for an engine, and more specifically to airfoils configured to reduce cross flow.

BACKGROUND

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a forward fan assembly, an aft fan assembly, a compressor for compressing air flowing through the engine, a combustor for mixing fuel with the compressed air such that the mixture can be ignited, and a turbine. The compressor, combustor and turbine are sometimes collectively referred to as the core engine.

Turbine engines include several components that utilize airfoils. By way of a non-limiting example, the airfoils can be located in the engine turbines, compressors, or fans. Stationary airfoils are often referred to as vanes and rotating airfoils are often referred to as blades.

DETAILED DESCRIPTION OF THE INVENTION

Figure 1:
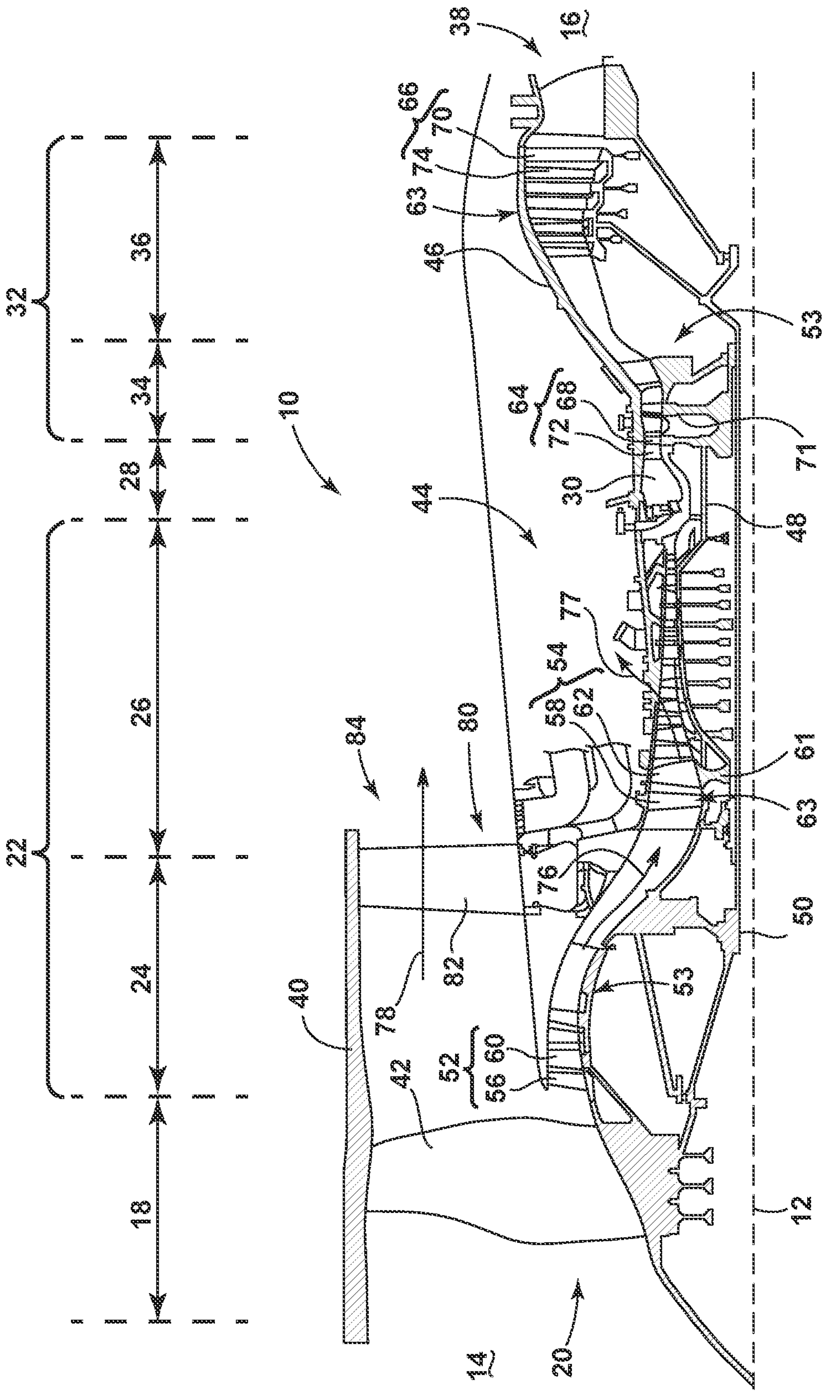
FIG. 1 is a schematic cross-sectional diagram for a turbine engine.

Aspects of this description are broadly directed to an airfoil for a turbine engine, where the airfoil can include multiple crossflow retarding aerodynamic structures such as end wall contouring (EWC) which can include a projection and a valley, a fence, and a splitter. Collectively, they can provide the airfoil with increased aerodynamic efficiency and significantly reduce secondary loss and exit swirl variation when compared to airfoils without the crossflow retarding aerodynamic structures.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The turbine engine 10 has a centerline or longitudinal axis 12 extending forward 14 to aft 16. The turbine engine 10 includes, in downstream serial flow relationship, a fan section 18 including a fan 20, a compressor section 22 including a booster or low-pressure (LP) compressor 24 and a high-pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the longitudinal axis 12. The HP compressor 26, the combustor 30, and the HP turbine 34 form an engine core 44, which generates combustion gases. The engine core 44 is surrounded by core casing 46, which can be coupled with the fan casing 40.

A HP shaft or spool 48 disposed coaxially about the longitudinal axis 12 of the turbine engine 10 drivingly connects the HP turbine 34 to the HP compressor 26. A LP shaft or spool 50, which is disposed coaxially about the longitudinal axis 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define an inner rotor/stator 53. While illustrated as a rotor, it is contemplated that the inner rotor/stator 53 can be a stator.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle assembly) to compress or pressurize the stream of fluid passing through the stage. In a single compressor stage 52, 54, multiple compressor blades 56, 58 can be provided in a ring and can extend radially outwardly relative to the longitudinal axis 12, from a blade platform to a blade tip, while the corresponding static compressor vanes 60, 62 are positioned downstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The static vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle assembly) to extract energy from the stream of fluid passing through the stage. In a single turbine stage 64, 66, multiple turbine blades 68, 70 can be provided in a ring and can extend radially outwardly relative to the longitudinal axis 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The static turbine vanes 72, 74 for a stage of the compressor can be mounted to the core casing 46 in a circumferential arrangement.

Complementary to the rotor portion, the stationary portions of the turbine engine 10, such as the static compressor and turbine vanes 60, 62, 72, 74 among the compressor and turbine section 22, 32 are also referred to individually or collectively as an outer rotor/stator 63. As illustrated, the outer rotor/stator 63 can refer to the combination of non-rotating elements throughout the turbine engine 10. Alternatively, the outer rotor/stator 63 that circumscribes at least a portion of the inner rotor/stator 53, can be designed to rotate.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and the engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
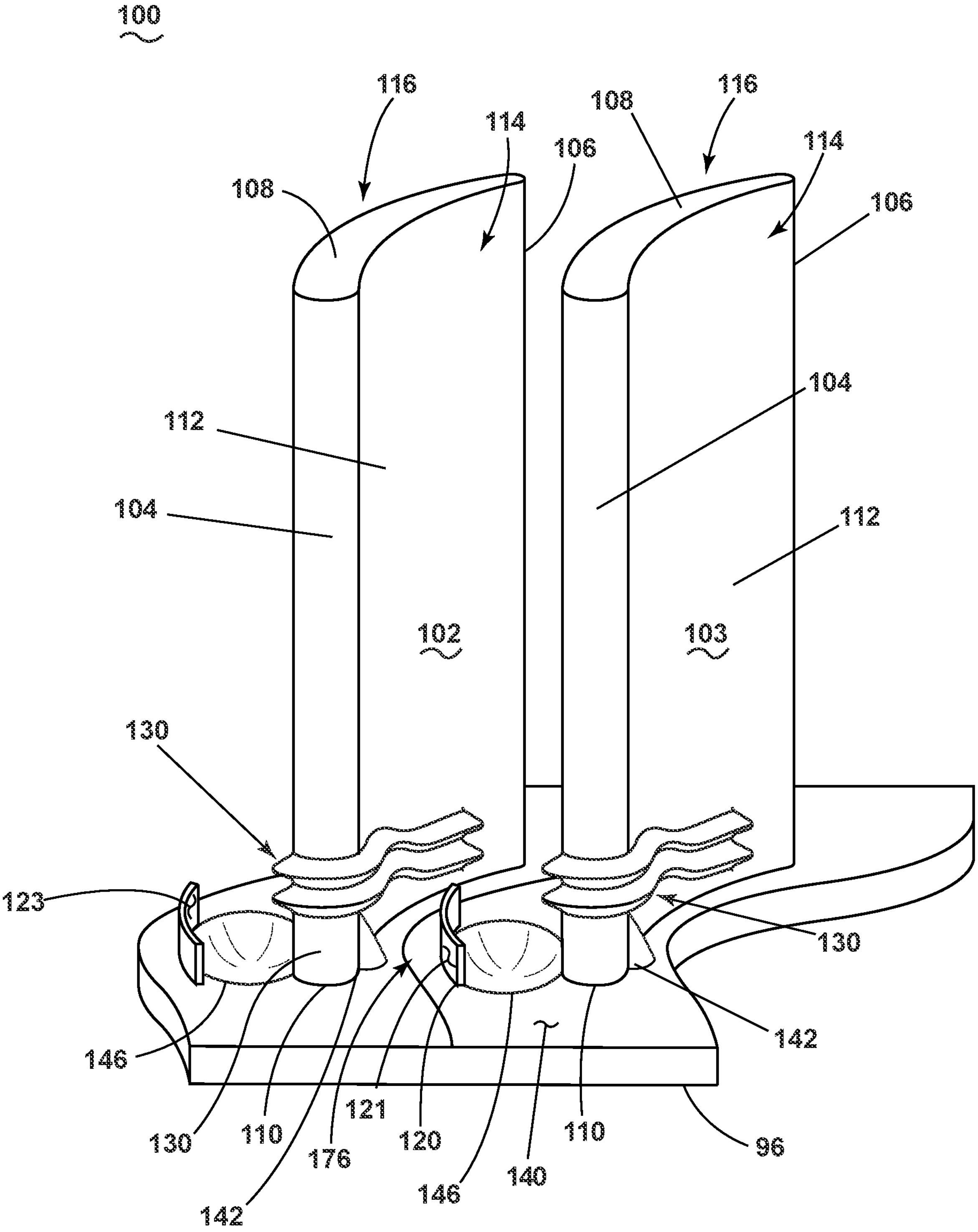
FIG. 2 is a perspective view of an airfoil assembly of turbine engine of FIG. 1 having circumferentially spaced airfoils, each with a pressure side and a suction side, extending upwardly from an endwall having a projection on the suction side, a valley formed in the endwall on the pressure side, a fence extending along the pressure side, and a splitter located between the airfoils and extending from the endwall.

FIG. 2 is a perspective view of an airfoil assembly 100 of the turbine engine 10 of FIG. 1 that includes multiple, spaced airfoils, specifically, a first airfoil 102 and a second airfoil 103 extending from an endwall defined by a platform or a surface 140. A variety of aerodynamic structures are provided to retard crossflow between the first and second airfoils 102, 103. The crossflow retarding aerodynamic structures include: a projection 142 and a valley 146 in the surface 140, and a splitter 120 located between the first and second airfoils 102, 103 and extending upwardly from the surface. The projection 142 and valley 146 help define a contour to the surface 140 and can be referred to as endwall contouring (EWC) of the airfoil assembly 100.

Each of the first and second airfoils 102, 103 has a leading edge 104, a trailing edge 106, a tip 108, a root 110 and an exterior wall 112. An axial direction extending generally from the leading edge 104 to the trailing edge can be called a chord-wise direction. Similar, a radial direction extending generally from the root to the tip can be referred to as a span-wise direction.

Each of the airfoils can be coupled to an inner band 96 which can be formed by a number of different components of the engine. For example, regardless of whether the airfoil is a stationary vane or a rotating blade, the inner band 96 can be what is referred to as the inner band of either rotor 53 or rotor/stator 63. Although not illustrated, an outer band can be provided radially displaced from the inner band 96 such that the inner band 96 is radially displaced inwardly from the outer band. In such a case, the outer band can form or otherwise be coupled to at least a portion of the rotor/stator 63, while the inner band 96 can be coupled to or otherwise form at least a portion of the rotor/stator 53. Alternatively, the inner band 96 can be defined as a first band and the outer band can be defined as a second band radially displaced from the first band. The first band can form or otherwise be coupled to at least a portion of the either rotor 53 or the rotor/stator 63, while the second band can form or otherwise be coupled to at least a portion of the radially opposite rotor 53 or the rotor/stator 63 to where the first band is located. As a non-limiting example, the first band could form or be coupled to at least a portion of the rotor/stator 63, while the second band could form or be coupled to at least a portion of the rotor/stator 53. In either case, the space between the inner band 96 and the outer band can define an annular region where the airfoils 102, 103 are spaced within. The inner band 96 can be defined by an upstream edge and a downstream edge with respect to the engine centerline 12. The surface 140 can extend between the upstream edge and the downstream edge.

The inner band 96 and the outer band can be formed by multiple circumferential segments, with each segment having a single airfoil and mounted to a disk by a dovetail. The inner band 96 or the outer band can be a continuous, unbroken surface. Alternatively, there can be holes, channels, ducts, cracks, troughs, or any other known feature placed throughout the inner band 96 or outer band. These various exemplarity features of the platform can be used for various reasons to improve overall engine efficiency. These features can be used as dust escape, cooling holes, or aerodynamic efficiency boosters.

The splitter 120 can be positioned between the first and second airfoils 102, 103 of the airfoil assembly 100 such that one side 121 of the splitter 120 can face a pressure side 114 of the first airfoil 102, while the other side 123 of the splitter 120 can face a suction side 116 of the second airfoil 103. The location of the splitter 120 can be shifted more toward one airfoil than another and moved in the chord-wise direction to obtain the desired aerodynamic effect in helping to retard cross flow. The splitter 120 can extend from the surface 140 as illustrated to a radially outer portion of the splitter to define a through-channel 176 between the one side 121 of the splitter and the exterior wall 112 of the corresponding first or second airfoil 102, 203.

A set of fences 130 can be formed as part of the exterior walls 112 of the first or second airfoils 102, 103. The set of fences 130 can be one or multiple undulations along the exterior wall 112 and positioned near the root 110 of the corresponding airfoil (e.g., the first airfoil 102 or the second airfoil 103). The set of fences 130 can be formed to extend around an entirety of the exterior wall 112 on the pressure side 114 of the airfoils 102, 103, as illustrated. Alternatively, the set of fences 130 can start and terminate at various locations along any portion of the exterior wall 112 as discussed herein. The set of fences 130 can be positioned near the root 110 of the first or second airfoils 102, 103. The set of fences 130 can be further defined to be formed integrally with the exterior wall 112. As such, the set of fences 130 can form a bump from the exterior wall 112. At the points where the set of fences 130 start or terminate, the set of fences 130 can taper toward or from the exterior wall 112 such that that the termination or starting points of the set of fences 130 are integral with the exterior wall 112.

The surface 140 can be formed as part of the inner band 96. The EWC can include various features such as, for example, the projection 142, and the valley 146. The projection 142 can be formed on the pressure side 114 of the airfoil, while the valley 146 can be formed on the suction side 116 of the first or second airfoils 102, 103 between the exterior wall 112 and the splitter 120.

Figure 3:
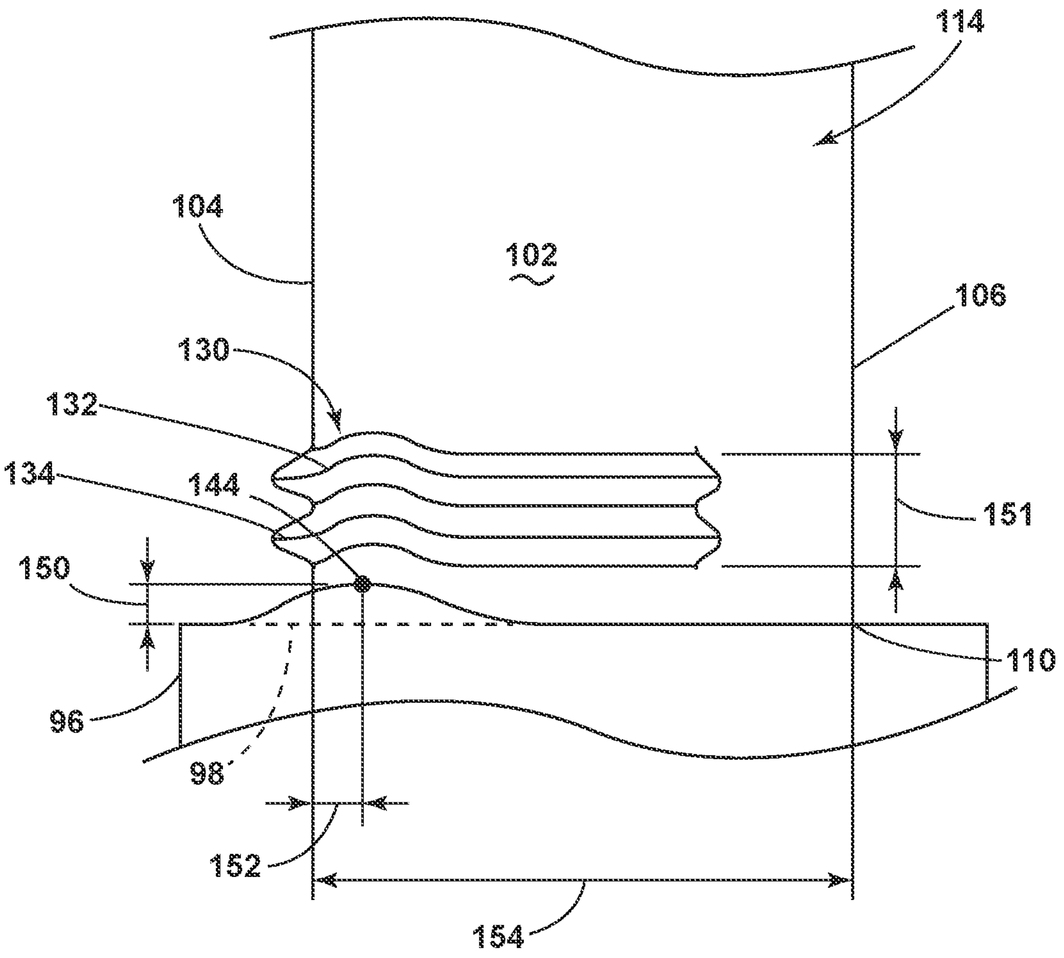
FIG. 3 is a side view of the pressure side of an airfoil of the airfoil assembly of FIG. 2 illustrating the location and height of the projection and fence relative to the surface.

FIG. 3 is a side view of the pressure side 114 of the first airfoil 102 of the airfoil assembly 100 of FIG. 2, illustrating the shape and location of the projection 142, its impact on the contour of the surface 140 of the inner band 96, and the relationship of the set of fences 130 with the projection 142. Although illustrated as the first airfoil 102, it will be appreciated that what is described herein can be attributed to the second airfoil 103 or any other airfoil in the airfoil assembly 100.

The projection 142 of the surface 140 can project from a surface baseline 98 defined to be a constant radial distance from the longitudinal axis 12 of the turbine engine 10. The surface baseline 98 can be further defined as a projection of the surface 140 that does not follow the contour formed through the EWC.

A portion of the surface 140 can diverge from the surface baseline 98 near the leading edge 104 of the first airfoil 102 toward the tip 108 to an apex 144, and then converge back to the surface baseline 98 to define the projection 142. The apex 144 of the projection 142 can extend from the surface baseline 98 at a height 150. The height 150 can be between 0.5% and 2.5% of a span of the first airfoil 102. As used herein, the span can be defined as the distance from the root 110 to the tip 108 of the first airfoil 102, with 100% of the span being the tip 108 and 0% being the root 110.

It is contemplated that the set of fences 130 can include a lower fence 134 and an upper fence 132 which can follow the contour of the surface 140 such that the radial height from the surface 140 and the upper and lower fences 132, 134, respectively, remains constant at all locations long the exterior wall 112 where the upper and lower fences 132,134 are present. As such, each fence 130 can be located a predetermined height above a local contour of the surface 140. As used herein, the local contour can be defined as the radial height of the surface 140 at a specific axial position along the first airfoil 102. Although illustrated as the upper and lower fences 132, 134, it will be appreciated that the set of fences 130 can include any number of one or more fences. Each fence 130 can be radially positioned from the surface baseline 98 at differing radial heights. The predetermined height of each fence 130 can be a constant height measured from the surface 140. Alternatively, the predetermined height of each fence 130 can increase or decrease linearly or non-linearly from the leading edge 104 to the trailing edge 106 of the first airfoil 102.

Specifically, the predetermined height of the set of fences 130 can be between 0% and 20% of the span of the first airfoil 102 as measured from the root 110. The set of fences 130 can include multiple fences, each being spaced from an adjacent fence in the span-wise direction. For example, the upper fence 132 and the lower fence 134 can each be further defined as adjacent fences of the set of fences 130 spaced apart from one another in the span-wise direction.

The set of fences 130 can include a thickness 151. The thickness 151 of the set of fences 130 can be defined as the radial distance the set of fences 130 extend along the span-wise direction of the corresponding airfoil. Specifically, the thickness 151 can be between 2% and 10% of the axial chord 154. The axial chord 154 can be defined as can be defined as the normal distance between the leading edge 104 and the trailing edge 106 of the corresponding airfoil (e.g., the first airfoil 102) in the axial direction.

The set of fences 130 can extend around at least a portion of the exterior wall 112 on the pressure side 114 of the first airfoil 102. As illustrated, the set of fences 130 can terminate along a portion of the exterior wall 112. Specifically, the set of fences 130 can terminate between 60% to 90% of the axial chord 154 on the pressure side 114 of the first airfoil 102. It will be further appreciated that at least a portion of the set of fences 130 can extend beyond the leading edge 104 of the first airfoil 102. Alternatively, the set of fences 130 can start begin at a portion of the first airfoil 102 located downstream the leading edge. As such, the set of fences 130 can include an upstream portion or otherwise be defined to start between −20% and 30% of the axial chord 154. As used herein, 0% of the axial chord 154 can be the leading edge 104 of the first airfoil 102 and 100% of the normalized axial chord 154 can be the trailing edge 106.

The set of fences 130 can be further defined to form a portion of the exterior wall 112. It is further contemplated that the set of fences 130 can smoothly taper into or out of the exterior wall 112 at the start or termination, respectively, of the set of fences 130. As such, each fence 130 can project outward from the exterior wall 112 of the first airfoil 102 a distance at the leading edge 104. The distance the set of fences 130 projects can reduce from the leading edge 104 toward the trailing edge 106. The distance the set of fences 130 project can vary linearly or non-linearly from the leading edge 104 to the trailing edge 106. It will be appreciated that the distance the set of fences 130 extend form the exterior wall 112 can further be defined as a width of the set of fences 130. The width of the set of fences 130 can be non-constant about the exterior wall 112.

Figure 4:
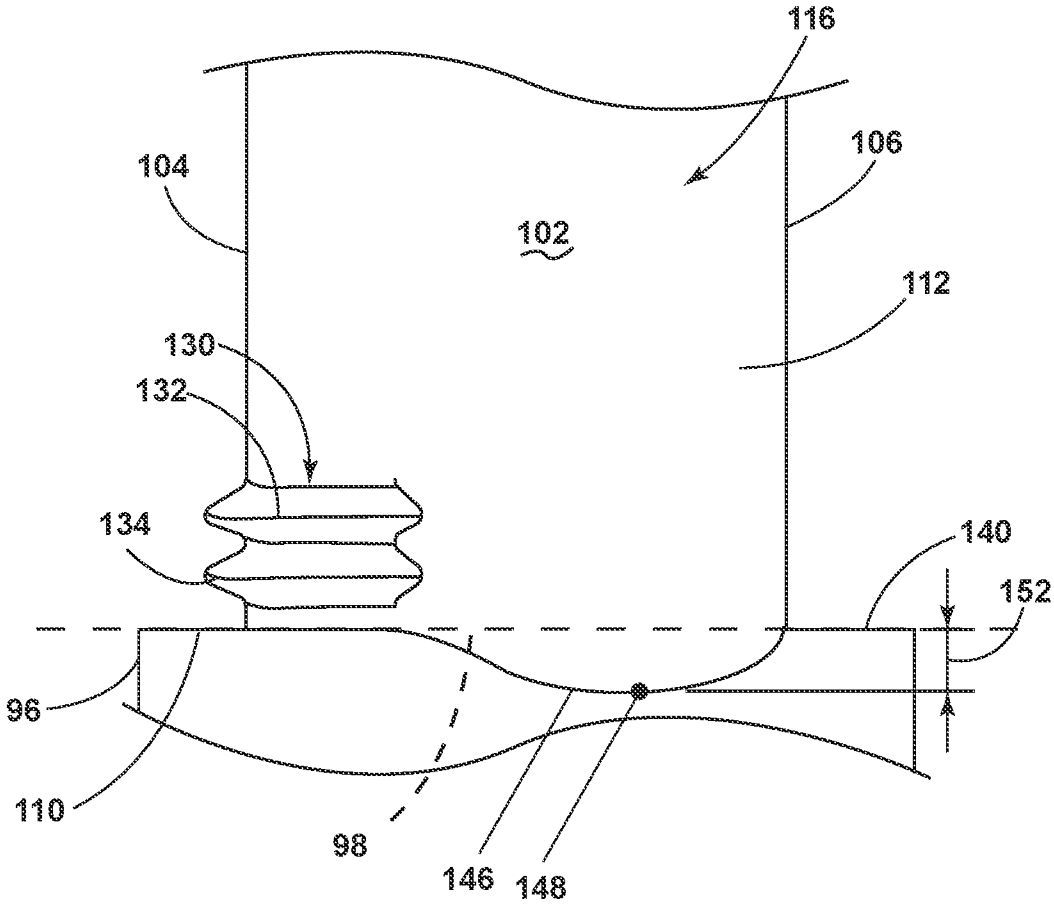
FIG. 4 is a side view of the suction side of an airfoil of the airfoil assembly of FIG. 2 illustrating the location of the valley on the suction side relative to the surface.

FIG. 4 is a side view of the suction side 116 of one of first airfoil 102 of the airfoil assembly 100 of FIG. 2, illustrating a portion of the set of fences 130, and the contour of the valley 146 on the suction side 116 of the first airfoil 102. Although illustrated as the first airfoil 102, it will be appreciated that what is described herein can be attributed to the second airfoil 103 or any other airfoil in the airfoil assembly 100.

The valley 146 can be defined as a portion of the surface 140 of the inner band 96 which diverges from the surface baseline 98 away from the tip 108 of the first airfoil 102 to a minimum 148. The minimum can extend into the surface 140 a depth 152 to define a maximum depth of the valley 146. The depth 152 can be between 0.15% and 1.5% of the span of the first airfoil 102. It is further contemplated that the valley 146 can be defined by a ratio of 3 between the maximum height of the projection 142 and the minimum or maximum depth of the valley 146.

As illustrated, the valley 146 can extend along at least a rear portion of the first airfoil 102 along the suction side 116. It will be appreciated that the valley 146, however, can extend along any portion of the first airfoil 102 along the suction side 116. For example, the valley 146 can extend from the leading edge 104 to the trailing edge 106 of the first airfoil 102. Alternatively, the valley 146 can extend beyond one or more of the leading edge 104 or the trailing edge 106. The valley 146 can further be defined by an upstream edge and a downstream edge, with the upstream edge located at or in front of (e.g., upstream stream of) the leading edge 104 of the corresponding airfoil 102, 103.

The valley 146 can further include a width. The width of the valley 146 can be defined as the total distance the valley extends along in the circumferential direction from the suction side 116 of the first airfoil 102. For example, the width of the valley 146 can have a circumferential width maximum width of 20% of the pitch from the first airfoil 102 to the second airfoil 103 (e.g., the valley 146 can extend along the surface 140 in the circumferential direction a maximum of 20% of the circumferential space between the first airfoil 102 and the second airfoil 103). As used herein, the pitch can be defined as the circumferential distance between the leading edges 104 of the first and second airfoils 102, 103. The pitch can be measured from the pressure side 114 of the first airfoil 102 to the suction side 116 of the second airfoil 103.

As illustrated, the set of fences 130, specifically the upper fence 132 and the lower fence 134, can terminate axially prior to the valley 146. As such, the set of fences 130 extend horizontally across the first airfoil 102 and do have a variance in the radial height from the surface 140 along the suction side 116. It is contemplated, however, that the at least a portion of the set of fences 130 can extend axially over a portion of the valley 146. As such, a portion of the set of fences 130 can follow the contour of the valley 146 and maintain a constant radial height from the surface 140. It is contemplated, that a portion of the set of fences 130 can extend radially inward from the surface baseline 98.

Figure 5:
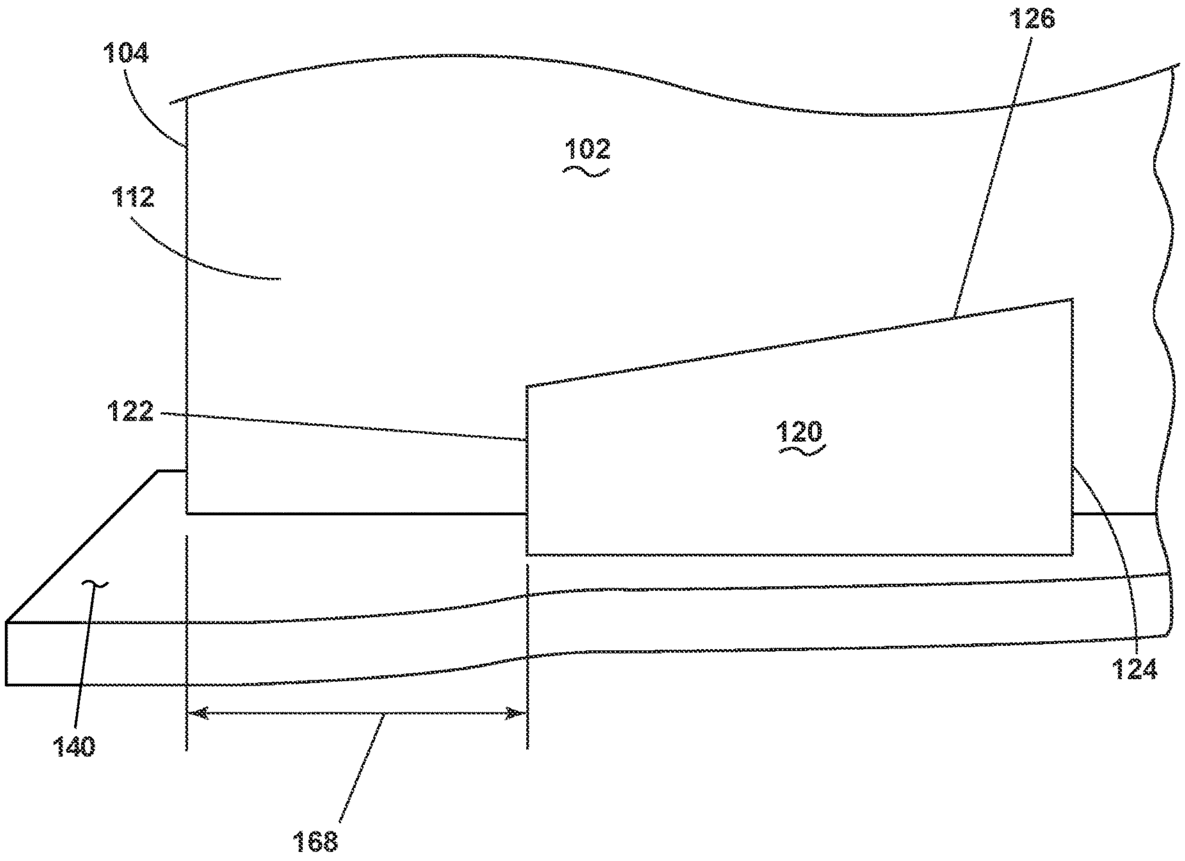
FIG. 5 is a side view of the pressure side of an airfoil of the airfoil assembly of FIG. 2 illustrating the location of the of splitter relative to the surface.

FIG. 5 illustrates the splitter 120 of the airfoil assembly 100 of FIG. 2 without the EWC of the surface 140, or the fence 130. The splitter 120 can include a leading edge 122, a trailing edge 124, and an inclined edge 126. The inclined edge 126 can be defined as the edge of the splitter radially farthest from the surface 140. Although illustrated as the first airfoil 102, it will be appreciated that what is described herein can be attributed to the second airfoil 103 or any other airfoil in the airfoil assembly 100.

The splitter 120 can be defined by a maximum radial height of the trailing edge 124. The maximum radial height of the trailing edge 124 of the splitter 120 can be 15% of the span of the first airfoil 102. The splitter 120 can be further defined by the inclined edge 126. The inclined edge 126 can be defined as a sloped edge which increases in height from the leading edge 122 to the trailing edge 124 of the splitter 120. The inclined edge 122 can extend linearly from the leading edge 122 to the trailing edge 124. Alternatively, the inclined edge 122 can extend non-linearly from the leading edge 122 to the trailing edge 124.

The leading edge 122 of the splitter 120 can be positioned a distance 168 from the leading edge 104 of the first airfoil 102. The distance 168 can defined to be along the axial chord 154 described herein. The distance 168 can be between −0.1% and 0.2% of the axial chord 154.

Figure 6:
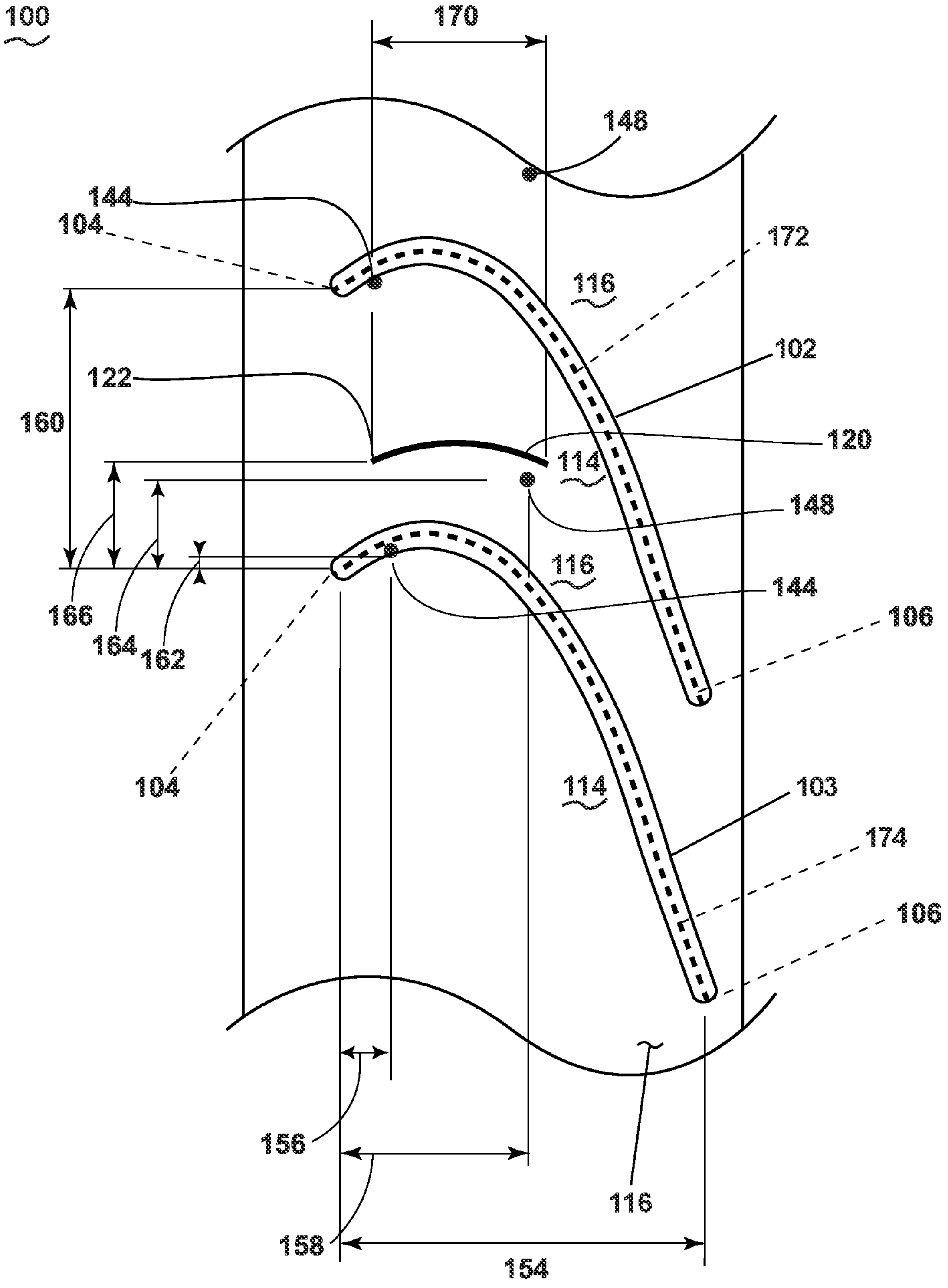
FIG. 6 is a radial view of the airfoil assembly of FIG. 2.

FIG. 6 is a radial view of the airfoil assembly 100 of FIG. 2 illustrating the axial, and circumferential placements of the splitter 120 and the EWC of the surface 140. As illustrated herein, the first and second airfoil 102, 103 are shown by a first and second mean camber lines 172, 174 respectively. It will be appreciated that the first and second mean camber lines 172, 174, and hence the first and second airfoils 102, 103, can take any form to include the leading edge 104, and a trailing edge 106.

As FIG. 6 illustrates the location of the projection 142, splitter 120, and the valley 146 relative to the first and second airfoils 102, 103, it will be helpful to define certain dimensional references. One of these references is the pitch 160, which is the circumferential distance between adjacent airfoils (e.g., the first and second airfoils 102, 103). Another dimensional reference is the axial chord 154, which is the projection of the airfoil chord onto the rotational axis of the engine. The airfoil chord is a line extending between the leading edge and the trailing edge. With these references, dimensions and/or locations for the projection 142, valley 146, and splitter 120 will be discussed herein.

The apex 144 of the projection 142 can be a distance 156 between −10% and 10% of the axial chord 154 from the leading edge 104 and the trailing edge 106 of the second airfoil 103. The apex 144 of the projection 142 can be a distance 162 of between 0% and 10% of the pitch 160 where 0% is the leading edge 104 of the second airfoil 103.

The minimum 148 of the valley 146 can be a distance 158 between 40% and 70% of the axial chord 154 from the leading edge 104 and the trailing edge of the second airfoil 103. The minimum 148 of the valley 146 can be a distance 164 between 0% and 20% of the distance from the leading edge 104 of the second airfoil 103 and the leading edge 122 of the splitter 120, where 0% is the leading edge 104 of the second airfoil 103.

The leading edge 122 of the splitter 120 can be a distance 166 between 30% and 70% of the pitch 160 from the leading edge 104 of the second airfoil 103. The splitter 120 can include an axial chord from the leading edge 122 to the trailing edge 124. The axial chord of the splitter 120 can be projected as a normalized axial chord 170 which can be defined as the normal distance between the leading edge 122 and the trailing edge 124 of the splitter 120 in the axial direction. The normalized axial chord 170 can have a length between 30% and 70% of the normalized axial chord 154 first or second airfoils 102, 103.

Figure 7C:
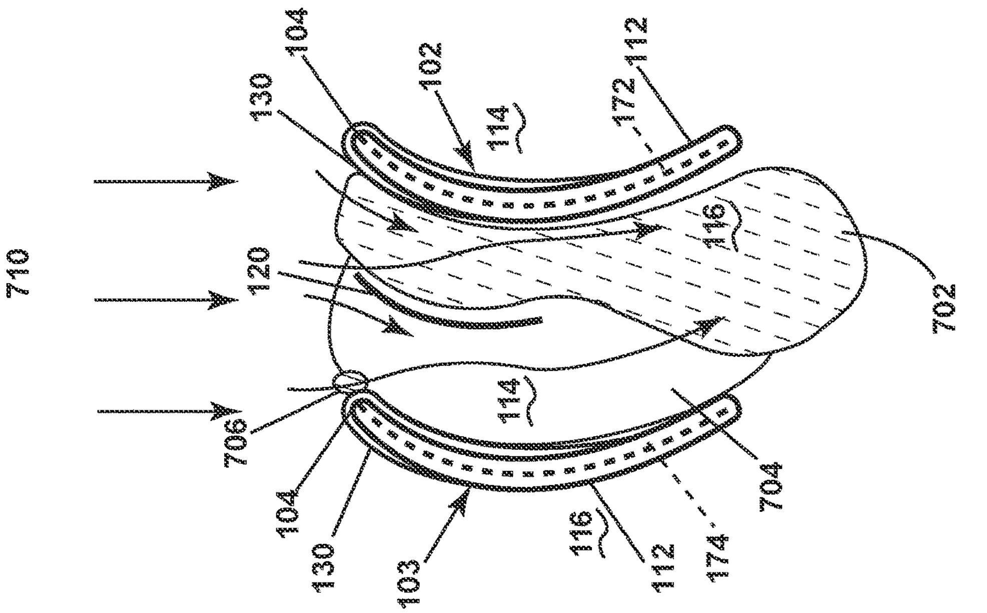
FIG. 7C is a top-down view of the airfoil assembly of FIG. 2 with the projection, valley, fence and splitter, of the crossflow retarding aerodynamic structures and the accompanying pressure regions, and airflow.
Figure 7B:
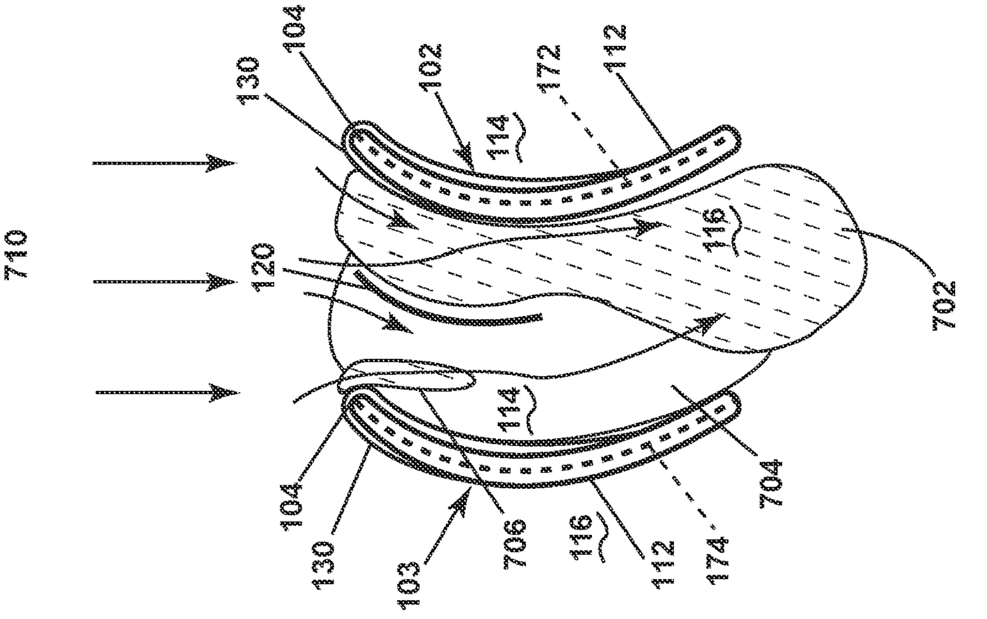
FIG. 7B is a top-down view of the airfoil assembly of FIG. 2 including the fence, and the splitter of the crossflow retarding aerodynamic structures and the accompanying pressure regions, and airflow.
Figure 7A:
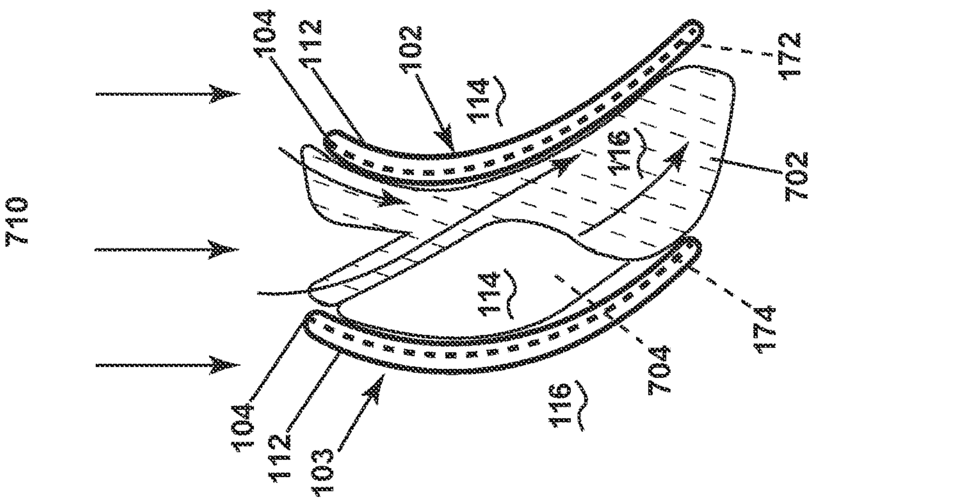
FIG. 7A is a top-down view of the airfoil assembly of FIG. 2 illustrating the airfoils alone without the projection, valley, fence and splitter of the crossflow retarding aerodynamic structures and the accompanying pressure regions, and airflow.

FIGS. 7A-7C illustrate the impact of the crossflow retarding aerodynamic structures on a cross flow. As used herein, the cross flow can be defined a transfer or crossing over of a fluid flow from one airfoil to another adjacent airfoil or structure.

As a first non-limiting example, FIG. 7A illustrates a top-down view of the airfoil assembly 100 including the first airfoil 102 defined by the first mean camber line 172 and the second airfoil 103 defined by the second mean camber line 174 of FIG. 2 without the crossflow retarding aerodynamic structures and illustrating a fluid flow 710 as it flows around the airfoil assembly 100.

As shown, the fluid flow 710 can impinge the leading edge 104 of the first and second airfoils 102, 103. The fluid flow 710 is drawn from the pressure side 114 of the second airfoil 103, toward the suction side 116 of the first airfoil 102 due to a pressure differential created between a high-pressure region 704 on the pressure side and a low-pressure region 702 on the suction side 116. Such a pressure differential results in a pressure gradient that encourages fluid flow crossing over from the high-pressure to the low-pressure.

The cross flow of the fluid flow 710 from the pressure side 114 of the second mean camber line 174 to the suction side 116 of the first airfoil 102, induces the low-pressure region to extend into the pressure side 114 of the second airfoil 103, which increases a boundary layer growth between the exterior wall 112 and the pressure side 114, which in turn decreases the overall efficiency of the airfoil assembly 100.

As a second non-limiting example, FIG. 7B illustrates a top-down view of the airfoil assembly 100 similar to FIG. 7A, except that the splitter 120 and the set of fences 130 are included. Illustrated are the resulting high- and low-pressure regions 704, 702, and the corresponding fluid flow 710 created around the airfoil assembly 100.

The addition of the splitter 120 and the set of fences 130 retards the fluid flow 710 from transferring over to the suction side 116 of the first airfoil 102. This, in turn, restricts a first low-pressure region 706 from transferring from the pressure side 114 of the second airfoil 103 to join with the low-pressure region 702 of the suction side 116 of the first airfoil 102. As a result, the high-pressure region 704 is increased and the low-pressure region is decreased in comparison with that of FIG. 7A. The high-pressure region 704 is further constrained between the pressure side 114 of the second airfoil and the splitter 120. This, in turn, retards the boundary layer growth between the exterior wall 112 and the pressure side 114, which in turn increases the overall efficiency of the airfoil assembly 100 when compared to that of FIG. 7A.

As a third non-limiting example, FIG. 7*c* illustrates a top down view of the airfoil assembly 100 of similar to FIG. 7A, except that, the splitter 120, the set of fences 130, and the EWC of the surface 140 are added. Illustrated are the resulting high- and low-pressure regions 704, 702, and the corresponding fluid flow 710 created around the airfoil assembly 100.

The addition of the EWC on top of the splitter 120, and the set of fences 130 retards the fluid flow 710 from transferring over to the suction side 116 of the first airfoil 102. This, in turn, reduces the pressure gradient by restricting the first low-pressure region 706 from transferring to join with the low-pressure region 702 of the suction side 116 of the first airfoil 102. The first low-pressure region 706 is significantly smaller than the first low-pressure region of FIG. 7B. As a result, the size of the high-pressure region 704 is further increased while still being constrained to between the pressure side 114 of the second airfoil and the splitter 120. This, in turn, further retards the boundary layer growth between the exterior wall 112 and the pressure side 114, which in turn increases the overall efficiency of the airfoil assembly 100 when compared to the airfoil assembly 100 of FIGS. 7A-7B.

Figure 8A:
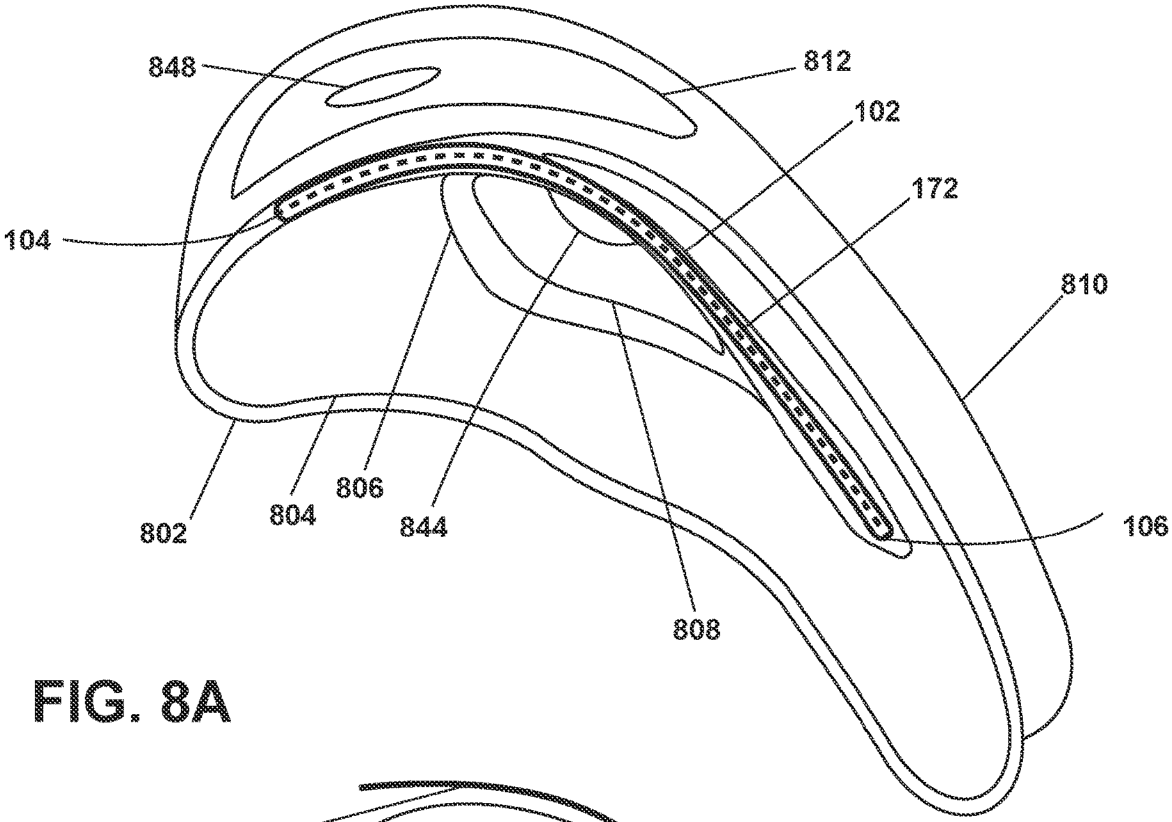
FIG. 8A is a topographical map of an example airfoil without the projection, valley, fence, and splitter of the crossflow retarding aerodynamic structures of FIG. 2.

FIG. 8A illustrates a topographical map of the first airfoil 102 of the airfoil assembly 100 of FIG. 2 without the splitter 120, or the set of fences 130. For this example, the first airfoil 102, defined by the first mean camber line 172 is shown, however, it will be appreciated that this can be applied to the second airfoil 103 or any other airfoil. FIG. 8A further illustrates the EWC of the surface 140 that would be needed to replicate the improvements described in FIG. 7C without the use of the splitter 120, or the set of fences 130.

The first airfoil 102 can be entirely surrounded by a baseline region 802 that can be defined to be the same height as the surface baseline 98 described herein. The surface 140 can then steadily increase in rising regions 804, 806, 808 until it reaches a projection region 844. The projection region 844 can be defined as a region in which the apex 144 is present. Conversely on the suction side 116 of the first airfoil 102 the surface 140 can steadily decrease in reduction regions 810, 812 until it reaches a minimum region 848. The minimum region 848 can be defined as a region in which the minimum 148 is present.

Figure 8B:
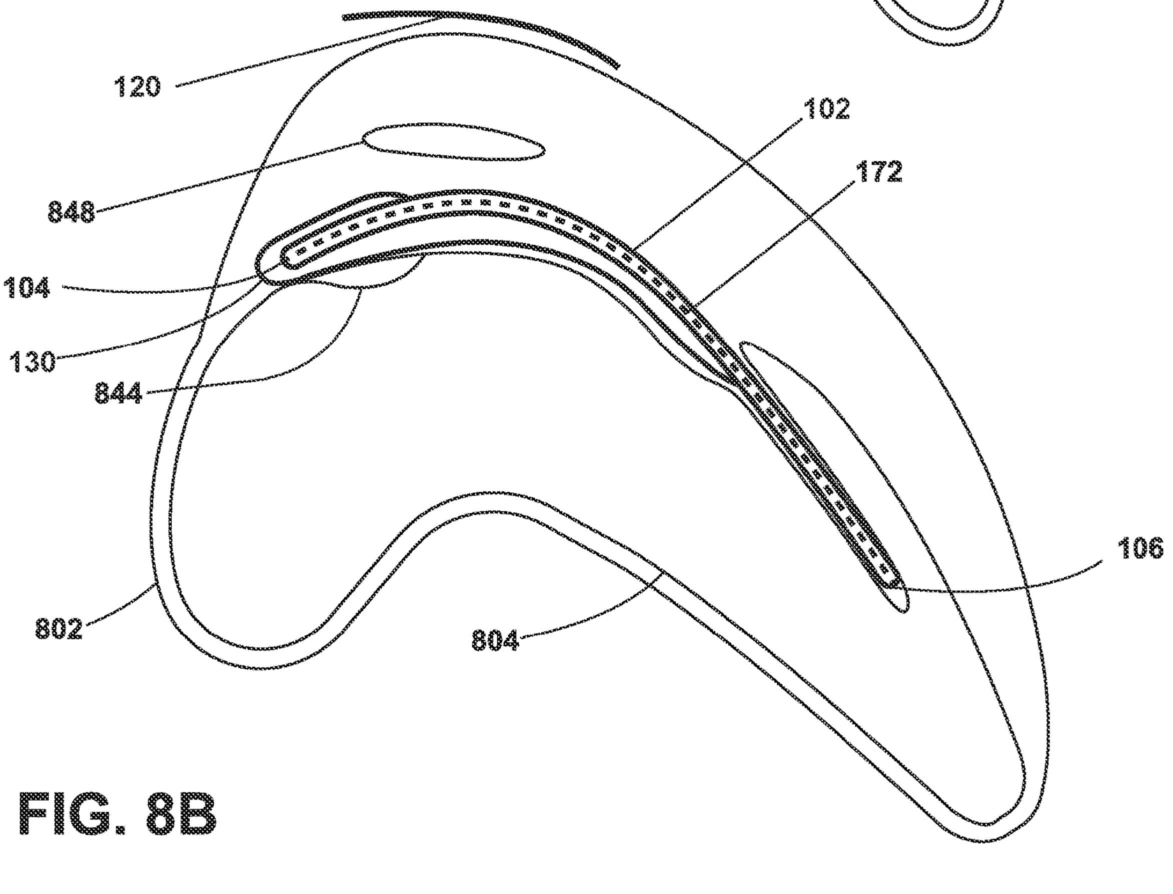
FIG. 8B is a topographical map of an airfoil of the nozzle assembly with the projection, valley, fence and splitter of the crossflow retarding aerodynamic structures of FIG. 2.

FIG. 8B illustrates a topographical map of the first airfoil 102 of the airfoil assembly 100 of FIG. 2 including the splitter 120, and the set of fences 130. For this example, the first airfoil 102, defined by the first mean camber line 172 is shown, however, it will be appreciated that this can be applied to the second airfoil 103 or any other airfoil.

With the implementation of the splitter 120, and the set of fences 130, the total depth or height needed to reach the minimum region 848 or the projection region 844, respectively, can be greatly reduced. As illustrated, one rising region 804 can be used to reach the projection region 844, while there can be no reduction regions to reach the minimum region 848. With the implementation of the splitter 120 and the fence 130, the amplitude of the minimum 148, or the apex 144 can be reduced by up to 75% when compared to that of FIG. 8A.

The EWC of the surface 140 can be allow for an improved efficiency of the turbine engine 10. The apex 144 being closer to the leading edge 104 of the first airfoil 102, and the reduction of the overall height of the apex 144 can be less disruptive to the fluid flow 710 around the first airfoil 102. This, in turn can increase the overall efficiency of subsequent stages downstream the airfoil assembly 100 and therefore increase the overall efficiency of the turbine engine 10. Similarly, the reduction in the depth of the minimum 148, and hence a shallower valley 146 can further limit the disruption of the fluid flow 710 and ultimately increase the efficiency of the turbine engine 10.

The airfoil assembly 100 including the splitter 120, the set of fences 130, and EWC of the surface 140 can further be a significant improvement upon the airfoil assembly 100 without the crossflow retarding aerodynamic structures as described herein, by greatly reducing an exit swirl variation, and secondary losses and therefore, increasing the overall efficiency of the turbine engine 10. The exit swirl variation can be defined as the difference in the angle of the fluid flow exiting the first or second airfoil 102, 103 at the trailing edge 106 along the entire span of the first or second airfoil 102, 103 with a reference value at of the angle of the fluid flow exiting at 50% along the span of the first or second airfoil 102, 103. With implementation of the crossflow retarding aerodynamic structures, the exit swirl variation can be decreased by 19% to 26%.

It will be appreciated that ranges used herein can include the values between the minimum and maximum along with the minimum and maximum themselves. For example, a range of 60% to 100% can include 60% and 100% and all of the numbers between.

Figure 9:
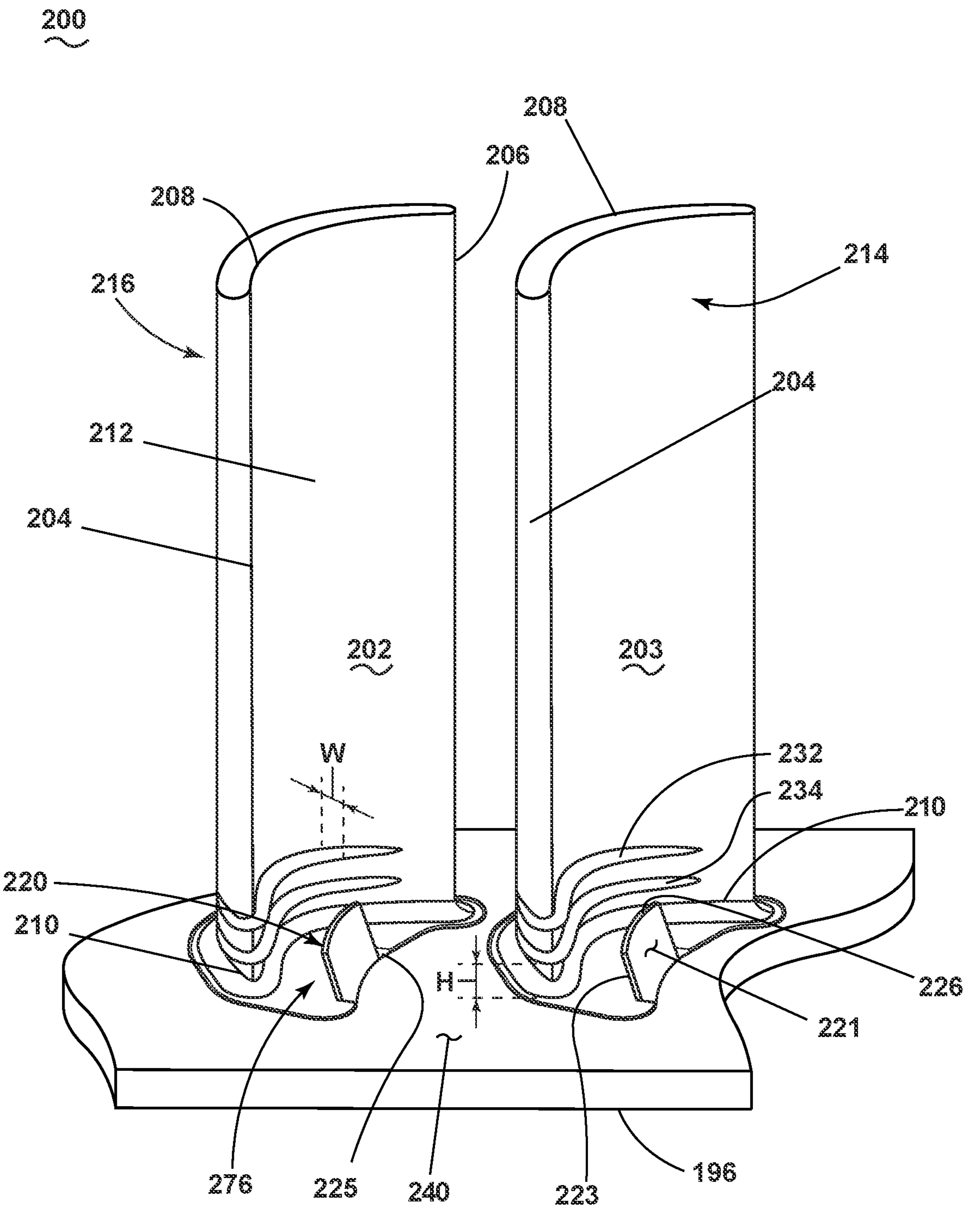
FIG. 9 is an enlarged view of an exemplary airfoil assembly of the turbine engine of FIG. 1 according to an aspect of the disclosure herein.

FIG. 9 is a perspective view of an exemplary airfoil assembly 200 of the turbine engine 10 of FIG. 1. The exemplary airfoil assembly 200 is similar to the airfoil assembly 100; therefore, like parts will be identified with like numerals in the 200 series, with it being understood that the description of the like parts of the airfoil assembly 100 applies to the airfoil assembly 200 unless otherwise noted.

The airfoil assembly 200 can include a set of spaced airfoils, specifically a first airfoil 202 and a second airfoil 203. The first airfoil 202 and the second airfoil 203 can each include a leading edge 204, a trailing edge 206, a tip 208, a root 210 and be bound by an exterior wall 212.

A variety of aerodynamic structures such as a set of fences 230 including, at least, an upper fence 232 and a lower fence 234, and a splitter 220 can be provided both on the exterior wall 212 and the surface 240 or platform to retard crossflow between the first airfoil 202 and the second airfoil 203.

As illustrated, the lower fence 234 can follow the contour of a surface 240 or platform of an inner band 196 such that the radial height (H) between the surface 240 and the lower fence 234 remains constant at all locations long the exterior wall 212 where the lower fence 234 is present. The upper fence 232, or any other subsequent fence, can follow the contour of the lower fence 234. Further, the set of fences 230 can project outward from the exterior wall 212 of the corresponding first or second airfoil 202, 203 a width (W) at the leading edge 204. The width (W) the set of fences 230 projects can reduce from the leading edge 204 toward the trailing edge 206.

The splitter 220 can be positioned between the spaced first airfoil 202 and the second airfoil 203 such that one side 221 of the splitter 220 faces the pressure side 214 of one of the first or second airfoils 202, 203, while the other side 223 of the splitter 220 faces the suction side 216 of the other one of the first and second airfoils 202, 203. The splitter 220 can curve toward the suction side 216 of the other one of the airfoils 202, 203 to define a concave shape such that the one side 223 facing the pressure side 214 defines a convex shape. The location of the splitter 220 can be shifted more toward one airfoil than another and moved in the chord-wise direction to obtain the desired aerodynamic effect in helping to retard cross flow. The splitter 220 can extend from the surface 240 or from an aperture 225 formed within the surface 240 as illustrated to a top or an edge 226 spaced from the exterior wall 212 to define a through-channel 276. The aperture 225 can be fluidly coupled to a cooling source and the concave shape of the side 221 can provide a channel along which a cooling fluid can flow.

Figure 10:
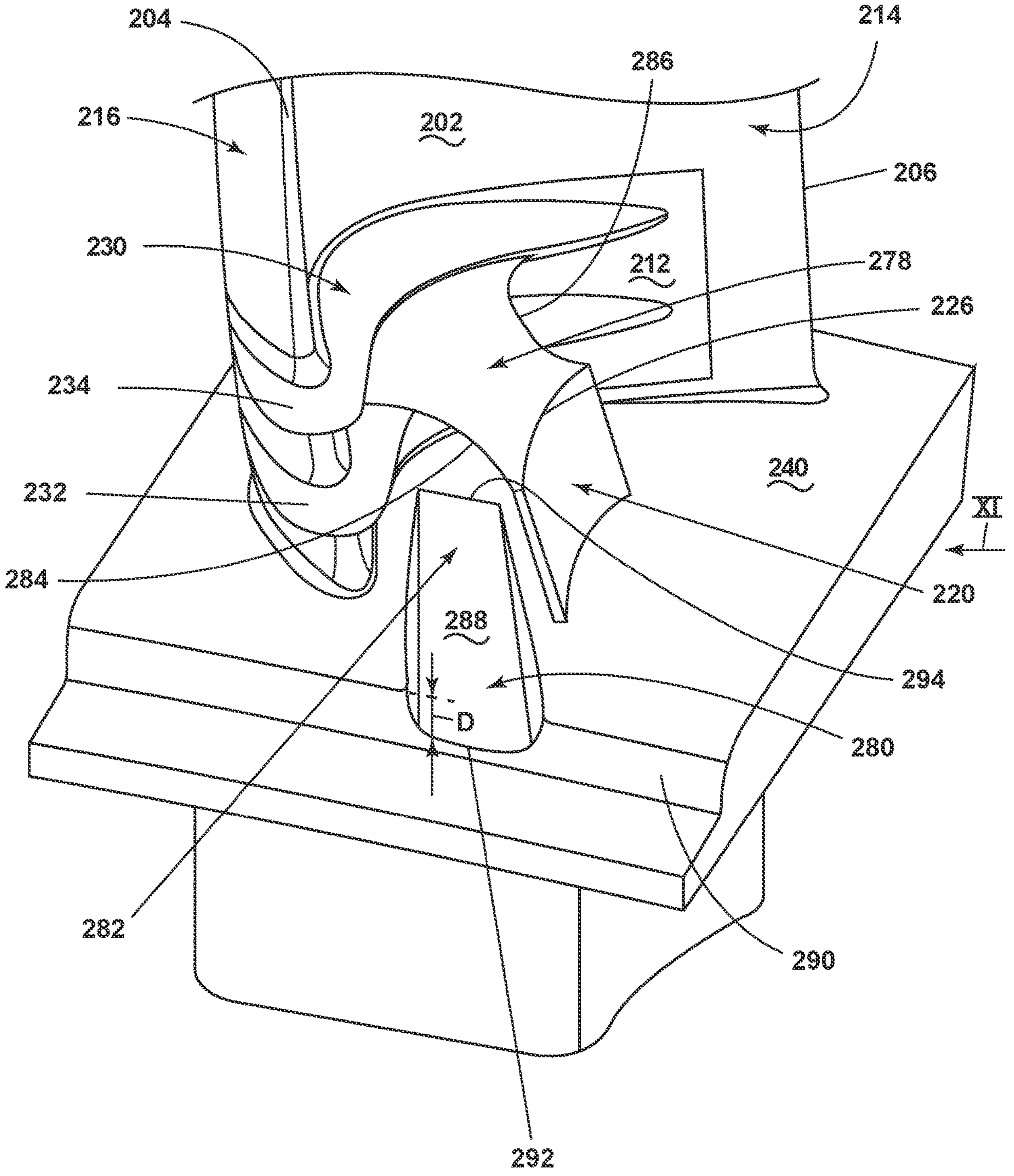
FIG. 10 is an enlarged view of a root portion of the exemplary airfoil assembly of FIG. 9, further including a tunnel and trench according to another aspect of the disclosure herein.

Turning to FIG. 10, additional aerodynamic structures 278, 280 are illustrated. The aerodynamic structure 278 extending from the splitter 220 toward the pressure side 214 is referred to herein as a bridge 278. The bridge 278 can extend from any portion of the splitter 220, by way of non-limiting example the edge 226 specifically a top of the splitter 220. The bridge 278 can connect the splitter 220 to the first airfoil 202, by way of non-limiting example to one fence of the set of fences 230. Although illustrated as the first airfoil 202, it will be appreciated that what is described herein can be attributed to the second airfoil 203 or any other airfoil in the airfoil assembly 200. The bridge 278 can be formed in any shape and provide a closure for the through-channel 276 of FIG. 9 to define a tunnel 282 extending between an inlet 284 and an outlet 286.

Yet another aerodynamic structure 280 referred to herein as a trench 280 is defined by a cavity 288 formed within the surface 240. As illustrated the cavity 288 can terminate at an end wall 290 of the surface 240 to define a trench inlet 292. The trench 280 can extend from the trench inlet 292 toward a trench outlet 294 proximate the pressure side 214 and located at or within the tunnel 282. The cavity 288 can define a decreasing depth (D) from the trench inlet 292 to the trench outlet 294 such that the trench 280 is flush with the surface 240 at or within the tunnel 282 at the trench outlet 294.

Figure 11:
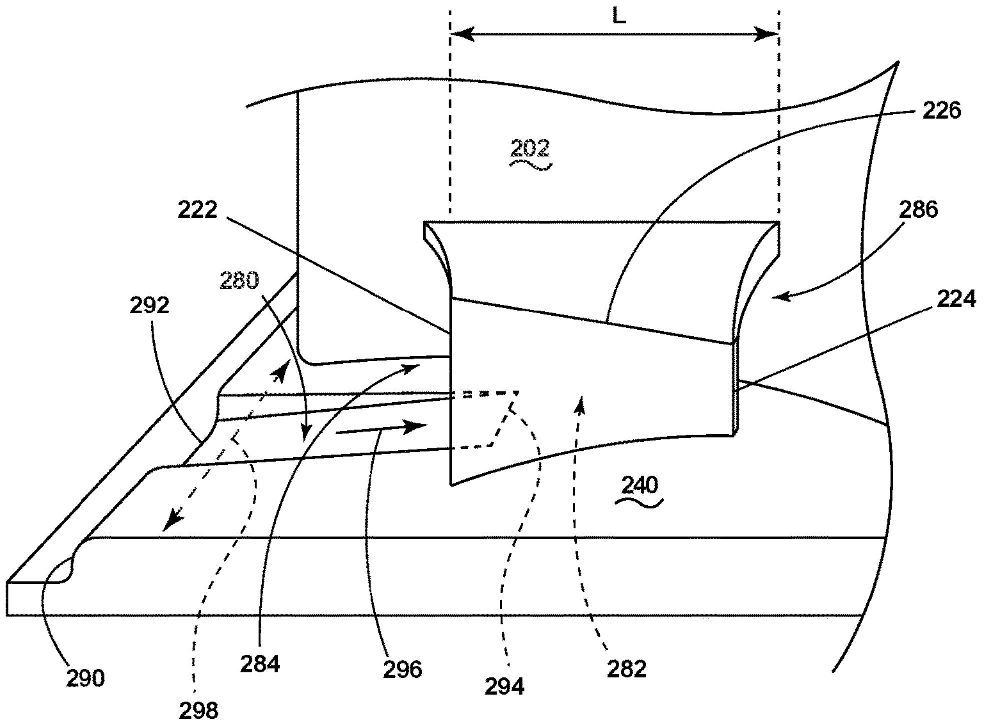
FIG. 11 is an isometric side view of the tunnel and trench of FIG. 10.

FIG. 11 illustrates a side view along line XI in FIG. 10 looking at the splitter 220. The splitter 220 can extend between a leading edge 222 or a fore edge and a trailing edge 224 or an aft edge with the top edge 226 defining an inclined edge 226 connecting the leading edge 222 to the trialing edge 224. The inclined edge 226 can increase or decrease as illustrated along a length (L) of the splitter 220. The inlet 284 can define a larger cross-sectional area than the outlet 286 such that a guided flow 296 accelerates when flowing from the inlet 284 to the outlet 286. The trench outlet 294 can be located just within the inlet 284 of the tunnel 282 as illustrated in dashed line. It is further contemplated that the trench outlet 294 is located at the inlet 284 of the tunnel 282 or prior to and/or outside of the tunnel 282. A dashed arrow 298 indicates a location range for the trench 280. As is indicated, the trench 280 can be located closer to the first airfoil 202 or further from the first airfoil 202 depending on a desired trench inlet 292 and trench outlet 294 location. In some cases the trench 280 can be located outside the tunnel 282 such that the trench outlet 294 exhausts the guided flow along the surface 240.

Figure 12:
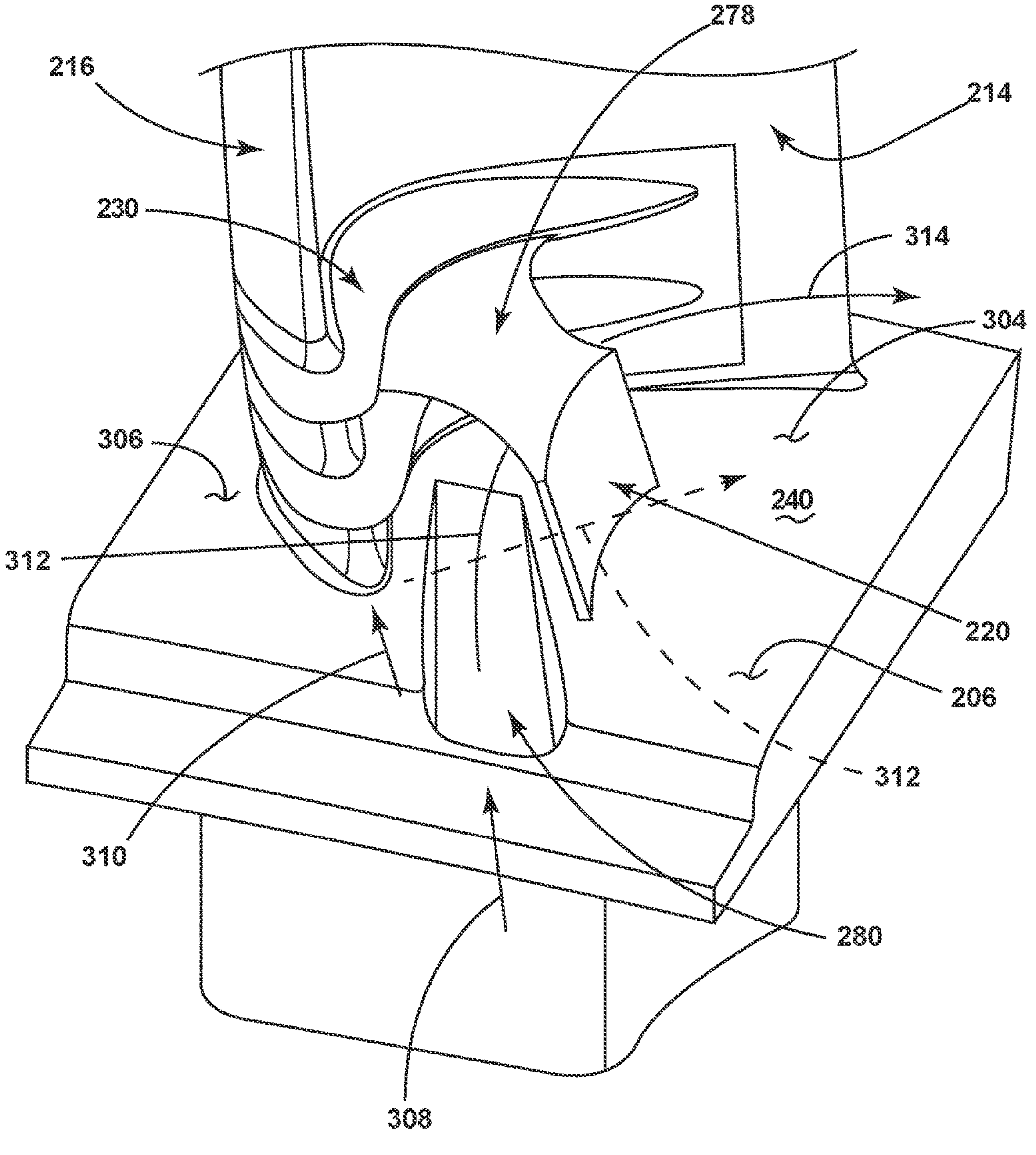
FIG. 12 is FIG. 3 again illustrating a method of containing and guiding a flow.

FIG. 12 illustrates a method of containing and guiding a flow through the trench 280 and tunnel 282 described herein. A fluid flow defined as a main fluid flow 310 can impinge the leading edge 204 of the airfoils 202, 203. The main fluid flow 310 can then be drawn from the pressure side 214 of the airfoil illustrated, toward (illustrated by dashed line 312) the suction side 216 of the other airfoil due to the pressure differential created between a high-pressure region 304 on the pressure side 214 and a low-pressure region 306 on the suction side 216 of the other airfoil (illustrated by the first airfoil 202 and the second airfoil 203 in FIG. 9). Such a pressure differential results a pressure gradient that encourages fluid flow crossing over from the high-pressure to the low-pressure. This crossing over flow is referred to as a cross flow 312. It should be understood that the high-pressure region 304 and low-pressure region 306 are in relation to each other, i.e. the high-pressure region 304 has a higher pressure than the low-pressure region 306.

As is illustrated, the set of fences 230 and the splitter 220 together can retard the main fluid flow 310 from flowing along the cross flow 312. As a result, the flow moving from high-pressure region 304 towards the low-pressure region 306 is reduced.

The additional aerodynamic structures 278, 280 only serve to enhance these benefits. The tunnel 282 formed by the bridge 278 serves to decrease mixing losses caused by any secondary flow 308, by way of non-limiting example flow coming from a seal, shaft, or disk below. The trench 280 serves to guide the secondary flow 308 to define the guided flow 312 which when passed through the tunnel 282 can become an accelerated flow 314.

The combination of the aerodynamic structures, the set of fences 230, the splitter 220, the bridge 278 and the trench 280 together contain and guide the secondary flow 308. The splitter 220 and bridge 278 together form the tunnel 282 which contains the secondary flow 308 and helps to reduce impact caused by any interaction of the main fluid flow 310 with the end wall 290 and injection of the secondary flow 308 from inter-stage seals or rotor tip clearance cavities. The trench 280 provides a guided path for the secondary flow 308 to enable orientation and driving of the secondary flow 308 in the most appropriate direction for minimization of impact on the main fluid flow 310. While each aerodynamic structure provides benefits as described herein, a combination of all of the aerodynamic structures provides the highest levels of improvement and benefits for containing and guiding flows within the engine.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An airfoil assembly for a turbine engine comprising an outer band, an inner band radially spaced inwardly from the outer band to define an annular region therebetween, and having an upstream edge and a downstream edge, with a surface extending therebetween, and multiple airfoils circumferentially spaced in the annular region wherein each corresponding airfoil of the multiple airfoils includes an outer wall defining a pressure side and a suction side extending between a leading edge and a trailing edge to define a chord-wise direction and extending between a root and a tip to define a span-wise direction, with the root abutting the surface, and a projection extending upwardly from the surface on the pressure side and a valley extending into the surface on the suction side to define a contour to the surface, and the projection having an apex located from the leading edge between −10% and 10% of a normalized axial chord line for the corresponding airfoil.

The airfoil assembly of any preceding clause wherein the projection has a height between 0.5% and 2.5% of a span from the root to the tip of the corresponding airfoil.

The airfoil assembly of any preceding clause wherein the valley has a maximum depth between 0.15% and 1.5% of the span of the corresponding airfoil.

The airfoil assembly any preceding clause wherein the maximum depth of the valley is located along the suction side less than 70% of axial chord along a mean camber line of the corresponding airfoil.

The airfoil assembly of any preceding clause wherein the valley has an upstream edge located at or in front of the leading edge of the corresponding airfoil.

The airfoil assembly of any preceding clause wherein the valley has a maximum circumferential width maximum of 20% of a pitch length from the suction side of the corresponding airfoil.

The airfoil assembly of any preceding clause wherein the valley has a maximum depth of 1.5% of the span of the corresponding airfoil.

The airfoil assembly of any preceding clause, further comprising a splitter extending upwardly from the surface and located between the pressure side and suction side of a pair of adjacent airfoils of the multiple airfoils.

The airfoil assembly of any preceding clause wherein the valley is located between the splitter and the suction side of the corresponding airfoil.

The airfoil assembly of any preceding clause wherein the valley is located closer to the splitter than the suction side of the corresponding airfoil.

The airfoil assembly of any preceding clause, further comprising at least one fence extending laterally from the pressure side of the corresponding airfoil.

The airfoil assembly of any preceding clause wherein the at least one fence comprises a set of fences having at least an upper fence and a lower fence, the upper fence being radially spaced from the lower fence.

The airfoil assembly of any preceding clause wherein the fence follows a local contour of the surface.

The airfoil assembly of any preceding clause wherein the at least one fence is located a predetermined height above the local contour.

The airfoil assembly of any preceding clause wherein the predetermined height is a fixed height.

The airfoil assembly of any preceding clause wherein the predetermined height linearly increases in a direction from the leading edge to the trailing edge.

The airfoil assembly of any preceding clause wherein the at least one fence wraps around the leading edge.

The airfoil assembly of any preceding clause wherein a distance the at least one fence projects from the pressure side reduces from the leading edge to the trailing edge.

The airfoil assembly of any preceding clause, further comprising a splitter extending upwardly from the surface and located between the pressure side and suction side of the corresponding airfoil, with a maximum depth of the valley located closer to the suction side of the corresponding airfoil than the splitter.

The airfoil assembly of any preceding clause wherein the projection has a maximum height between 0.5% and 2.5% of a span from the root to the tip the corresponding airfoil, the valley extends along the suction side from the leading edge to the trailing edge and has a maximum depth of 1.5% of the span, and a maximum width of 20% of a pitch length from the suction side, a ratio of the height to the maximum depth is 3, and the fence wraps around the leading edge, terminates before the trailing edge, and projects a distance from the pressure side, with the distance diminishing from the leading edge toward the trailing edge.

What is claimed is:

1. An airfoil assembly comprising:

a platform having an upstream edge, a downstream edge and a surface extending therebetween, with at least a portion of the surface extending circumferentially along a surface baseline defined by a constant radius;

an airfoil extending from the platform and having an outer wall extending between a leading edge and a trailing edge and between a root and a tip defining a span-wise direction, the outer wall defining a pressure side and a suction side;

a fence along the outer wall and defining a raised potion of the outer wall, the fence following a local contour of the surface; and at least one of:

a projection located along the platform and extending along the outer wall, the projection extending radially outward from the surface baseline; or a valley located along the platform and defining a depression formed along the surface, the valley extending radially inward from the surface baseline to a maximum depth;

wherein at least a portion of the fence follows the local contour defined by at least one of the projection or the valley.

2. The airfoil assembly of claim 1, wherein the fence wraps around the leading edge of the airfoil.

3. The airfoil assembly of claim 1, wherein the airfoil includes a mean camber line, and the fence is asymmetric about the mean camber line.

4. The airfoil assembly of claim 3, wherein the fence extends along the pressure side with respect to the mean camber line a first distance, and along the suction side with respect to the mean camber line a second distance, less than the first distance.

5. The airfoil assembly of claim 1, wherein the airfoil includes a mean camber line, and the fence includes a radial width, with respect to the mean camber line, the radial width being non-constant along a respective portion of the fence.

6. The airfoil of claim 5, wherein the radial width decreases from an axially upstream portion to an axially downstream portion of the fence.

7. The airfoil assembly of claim 1, wherein the airfoil assembly is located in a turbine engine having a longitudinal axis, and the airfoil has an axial chord defined as a normal axial distance with respect to the longitudinal axis, between the leading edge and the trailing edge.

8. The airfoil assembly of claim 7, wherein the fence terminates at an axially downstream end that is greater than or equal to 60% and less than or equal to 90% of the axial chord from the leading edge to the trailing edge.

9. The airfoil assembly of claim 7, wherein the fence terminates at an axially forward end that is greater than or equal to −20% and less than or equal to 30% of the axial chord, where 0% of the axial chord corresponds to the leading edge.

10. The airfoil assembly of claim 7, wherein the fence includes a maximum thickness in the span-wise direction, the maximum thickness being greater than or equal to 2% and less than or equal to 10% of a length of the axial chord from the leading edge to the trailing edge.

11. The airfoil assembly of claim 1, wherein the fence is a first fence, the airfoil assembly further including a second fence along the outer wall, the first and second fences spaced apart along the airfoil in the span-wise direction.

12. The airfoil assembly of claim 1, wherein a portion of the fence on the pressure side follows the local contour defined by the projection, while a portion of the fence on the suction side follows the local contour defined by the valley.

13. The airfoil assembly of claim 1, wherein the fence terminates axially prior to the valley on a side of the airfoil corresponding to the valley.

14. An airfoil assembly comprising:

a platform having an upstream edge, a downstream edge and a surface extending therebetween, with at least a portion of the surface extending circumferentially along a surface baseline defined by a constant radius;

an airfoil extending from the platform and having an outer wall extending between a leading edge and a trailing edge and between a root and a tip to define a span of the airfoil, the outer wall defining a pressure side and a suction side, the airfoil having an axial chord measured as a normal distance between the leading edge and the trailing edge;

a fence located along the outer wall and defining an undulation along a respective portion of the outer wall, the fence being located a predetermined height from the surface along the span of the airfoil, the predetermined height being between 0% and 20% of the span as measured from the root, the fence being spaced from the surface, and the fence having a thickness defined as a distance the fence extgends relative to the span, the thickness being between 2% and 10% of the axial chord; and a splitter located along the surface being circumferentially offset from the airfoil, the splitter extending radially outward from the surface baseline.

15. The airfoil assembly of claim 14, further comprising at least one of:

a projection along the platform and extending along the outer wall, the projection extending radially outward from the surface baseline; or a valley along the platform and defining a depression formed along the surface, the valley extending radially inward from the surface baseline to a maximum depth.

16. The airfoil assembly of claim 14, further comprising a trench provided circumferentially between the splitter and the airfoil.

17. The airfoil assembly of claim 14, wherein the fence terminates radially away from the surface at an edge, with the edge having a non-constant radial height from the surface to define the edge as an angled edge.

18. An airfoil assembly comprising:

a platform having an upstream edge, a downstream edge and a surface extending therebetween, with at least a portion of the surface extending circumferentially along a surface baseline defined by a constant radius;

an airfoil extending from the platform and having an outer wall extending between a leading edge and a trailing edge and between a root and a tip, the outer wall defining a pressure side and a suction side;

a fence located along the outer wall and defining a raised potion of the outer wall;

a splitter located along the surface being circumferentially offset from the airfoil, the splitter extending radially outward from the surface baseline; and a bridge extending circumferentially between the splitter and at least one of the outer wall or the fence.

19. The airfoil assembly of claim 18, wherein the bridge extends circumferentially between the fence and a respective portion of the splitter.

20. An airfoil assembly comprising:

a platform having an upstream edge, a downstream edge and a surface extending therebetween, with at least a portion of the surface extending circumferentially along a surface baseline defined by a constant radius;

an airfoil extending from the platform and having an outer wall extending between a leading edge and a trailing edge and between a root and a tip, the outer wall defining a pressure side and a suction side;

a fence located along the outer wall and defining a raised potion of the outer wall;

a splitter located along the surface being circumferentially offset from the airfoil, the splitter extending radially outward from the surface baseline; and a trench provided circumferentially between the splitter and the airfoil, the trench terminating at an outlet that is provided circumferentially between the splitter and the airfoil, with the outlet being axially aligned with a respective portion of the splitter.

* * * * *